UNITED STATES PATENT OFFICE.

HENRY DEACON, OF LANCASTER COUNTY, ENGLAND.

IMPROVEMENT IN THE MANUFACTURE OF CHLORINE.

Specification forming part of Letters Patent No. 141,333, dated July 29, 1873; application filed July 18, 1873.

*To all whom it may concern:*

Be it known that I, HENRY DEACON, of Appleton House, Widnes, near Warrington, in the county of Lancaster and Kingdom of England, alkali manufacturer, have invented Improvements in the Manufacture of Chlorine, of which the following is a specification:

Chlorine is frequently manufactured by what is known as Deacon's process—that is, by passing a heated current of hydrochloric-acid gas and air over porous substances impregnated with some active substance, such as sulphate of copper, which is generally dissolved in water, and then used to saturate porous materials—such as pieces of burned clay.

The active substance—such as sulphate of copper—is also generally used alone, or as a simple salt; or, when two or more substances or salts are mixed together, each salt is active when used alone. In the specification of Letters Patent granted to me for "Improvements in the Manufacture of Chlorine," and dated the 29th December, 1868, No. 85,370, such a mixture is described, composed of two active substances, namely, oxide of copper and oxide of manganese.

Now, my present invention consists in mixing the active substance or substances with one or more substances of another class, which, when used alone, are inactive or inert—that is, they no not possess the power of decomposing heated hydrochloric-acid gas when mixed with air or oxygen in any material degree; but when mixed with the sulphate of copper (*ceteris paribus*) they materially increase its activity and decomposing power. Sulphate of soda and sulphate of potash are types of this class of inactive and what I term accelerating substances.

In applying this invention, the active salt, which, for example, may be sulphate of copper, and the inactive but accelerating salt, which, for example, may be about an equivalent quantity of sulphate of soda, may be dissolved in water; and porous materials—such as pieces of burned clay—may be saturated with the solution. These saturated or impregnated materials may be used in apparatus described in the specification of Letters Patent granted to me for "Improvements in Apparatus for the Manufacture of Chlorine," and dated 22d August, 1871, No. 118,209, and the manufacture of chlorine may be proceeded with as described therein; or the said mixture of active with inactive but accelerating substances may be employed for effecting the generation of chlorine in the manner before mentioned, or may be used and applied for such purpose in any other convenient manner.

In the practical manufacture of chlorine by what is known as Deacon's process the gases which are passed through the apparatus always contain more or less free sulphuric acid, and for this reason, as well as from its suitability in other respects, sulphate of copper is the active substance now practically employed. The sulphate of potash and the sulphate of soda have so much greater accelerating power than other substances with which I have experimented, and can be so easily obtained, that the choice, practically, lies between them. Sulphate of potash is slightly more accelerating than sulphate of soda, but it is less soluble and more expensive; hence, sulphate of soda is the accelerating substance I generally prefer, and I prefer to use somewhat more of it than is equivalent to the sulphate of copper employed. I prefer to mix the active and inactive substances or salts in solution, and to use the solution as strong and as warm as can be conveniently worked with. A saturated solution of sulphate of soda and of sulphate of copper at the temperature of about 180° Fahrenheit will have a specific gravity of about 1.310, and will contain a mixture of about three equivalents of the soda-salt to two equivalents of the copper-salt, and will usually be convenient for the desired purpose. If after one saturation of the porous materials before referred to with this solution the porous materials are dried and resaturated with the same solution, a further quantity of salts will be retained by the porous materials, but their activity in the manufacture of chlorine will not be materially increased thereby; but if a solution is employed in the first instance which is not saturated with the before-mentioned salts, then the activity of the porous material will be reduced almost in simple proportion to the extent of the dilution of the impregnating solution.

Burned clay roughly in the shape of small spheres is the porous material I usually find most convenient, and I prefer to employ burned clay, which does not materially decompose the copper-salt when impregnated with its solution; but it is sometimes difficult to procure such burned clay, and I then add some free sulphuric acid to the solution to neutralize the base in the clay, which acts on the sulphate of copper; but free acid in the solution reduces the solubility of the copper-salt, and to that extent is an evil, and its use should therefore be avoided or restricted as much as possible.

I prefer having all the materials and substances as free as possible from chlorides.

I claim—

The employment of a mixture of an inactive but accelerating substance, such as sulphate of soda, with an active substance, such as sulphate of copper, for the production of chlorine in what is known as Deacon's process for the manufacture of chlorine.

In witness whereof I have signed my name to this specification in the presence of two subscribing witnesses.

HENRY DEACON.

Witnesses:
ALEXANDER WALKER,
Kaludah Terrace, Appleton, Lancaster.
JOHN HOWARD,
Church Place, Rancoon, Cheshire.